March 17, 1931. E. G. KIMMICH 1,797,193

METHOD OF MAKING FLEXIBLE CONDUITS

Original Filed Aug. 3, 1926

Inventor
Elmer G. Kimmich,
Attorney

Patented Mar. 17, 1931

1,797,193

UNITED STATES PATENT OFFICE

ELMER G. KIMMICH, OF AKRON, OHIO, ASSIGNOR TO THE GOODYEAR TIRE & RUBBER COMPANY, OF AKRON, OHIO, A CORPORATION OF OHIO

METHOD OF MAKING FLEXIBLE CONDUITS

Original application filed August 3, 1926, Serial No. 126,810. Divided and this application filed October 20, 1927. Serial No. 227,506.

My invention relates to the manufacture of flexible conduits, particularly related to a method of making a highly flexible and supple conduit which is capable of withstanding heavily imposed radial loads.

This application is a division of my application Serial No. 126,810, filed August 3, 1926.

Flexible tubing is often utilized for conveying finely divided material, such as grain or dust, by employing suction through the conduit. Hose of this character is also useful in conveying liquids, such as water from the holds of ships. It is also employed to advantage for conducting fluid under pressure, such, for example, as compressed air to a pneumatically operated tool. In each of these applications, a highly flexible hose of light weight is desirable, as the service in which it is employed is of such nature as to require a continual change in the position of the conduit.

It is to be noted that flexible conduits should have a high strength in a radial direction, to prevent bursting with attendant loss. Hose employed for conveying dust is subjected to a high atmospheric pressure applied radially toward the center. Hose utilized for conveying air under pressure must, however, withstand a high pressure which is directed radially outwardly. Flexible conduits employed for conveying liquids must not only be sufficiently strong to withstand the internal normal pressure, but they must be so constructed that they will not burst when the conduit is bent with the liquid confined therein. This requirement necessitates the provision of a tubing which may not only be bent readily, but which also has a high degree of elasticity.

Various types of flexible conduits have been proposed, but none of them, so far as I am aware, has been suitable for use in all of the classes of service illustrated by the foregoing examples. In certain constructions, strength has been sacrificed to attain flexibility, while other conduits have been so constructed that they could not withstand externally applied normal loads, although they could sustain high internal pressures.

It is one of the objects of the invention to provide an efficient method of making a highly flexible and supple hose or conduit which is capable of withstanding loads applied either radially inwardly or outwardly.

Additional objects and advantages will become apparent from the following detailed description of a preferred form of practicing the invention, wherein reference is made to the accompanying drawing, in which.

Figure 1:
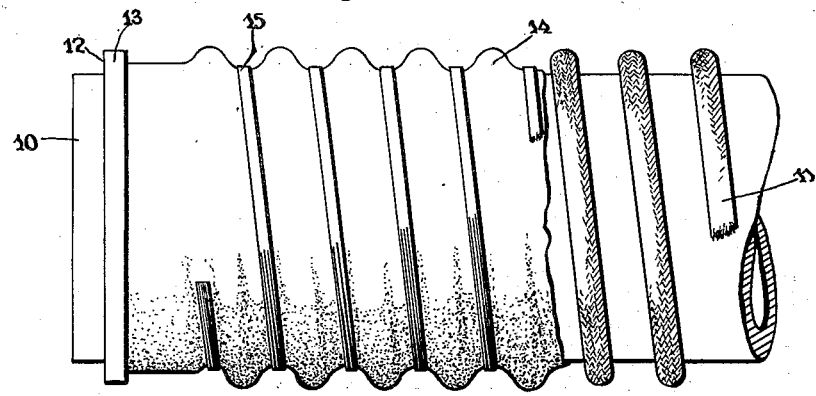
Fig. 1 is a fragmentary plan view of the conduit as it appears during an early stage of its construction, parts being broken away for the sake of clearness.

Preferably, the hose is formed in straight lengths by building it upon a hollow cylindrical pole or mandrel, indicated by the reference numeral 10. A band, such, for example, as a rope 11, of suitable diameter to form convolutions in the hose, is wrapped in the form of a helix around the mandrel, and the ends are secured thereto by any suitable means; for example, by means of a piece of tape. It has been found that the proper flexibility may be imparted to the hose, for the different diameters in which it may be constructed, by spacing the turns at a distance equal to about twice the diameter of the rope.

Positioned on the mandrel 10, adjacent the ends of the rope 11, are collars 12 having annular flanges 13. These members are employed in order to form a cylindrical portion at either end of the hose for the attachment of suitable couplings, and they are also advantageous to facilitate the removal of the hose from the mandrel in a manner which will be subsequently apparent.

A ply of rubberized fabric 14, preferably cut on a bias, is then wrapped loosely over the helically arranged rope 11, with its edges overlapping the flanges 13 on the collars 12. While it is preferred to apply the fabric ply 14 cylindrically, satisfactory results may also be obtained by wrapping the fabric helically around the mandrel. The loose end of the rubberized fabric 14 may be secured to the body thereof by attaching it to a gum strip or a ribbon of unvulcanized tacky rubber.

When the fabric ply 14 is so positioned, it is pulled tightly into the spaces between the successive convolutions of the rope 11, preferably by means of a wire 15, which is also employed as a reinforcing element. The wire should have sufficient temper to lie snugly against the fabric, and it should be applied with sufficient force to remove the looseness in the fabric 14, and to cause it to follow closely the contour of the mandrel 10 with the rope 11 positioned thereon. This phase of the construction is illustrated in Fig. 1 of the drawing.

Figure 2:
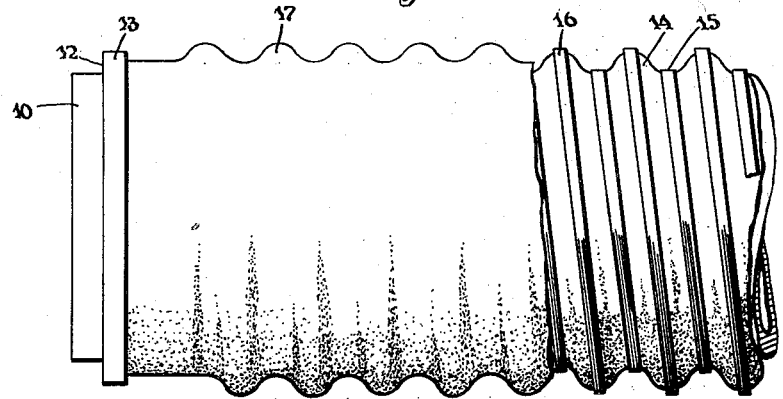
Fig. 2 is a fragmentary plan view of the conduit as it appears in a more advanced stage of construction, parts being broken away for the sake of clearness.
Figure 3:
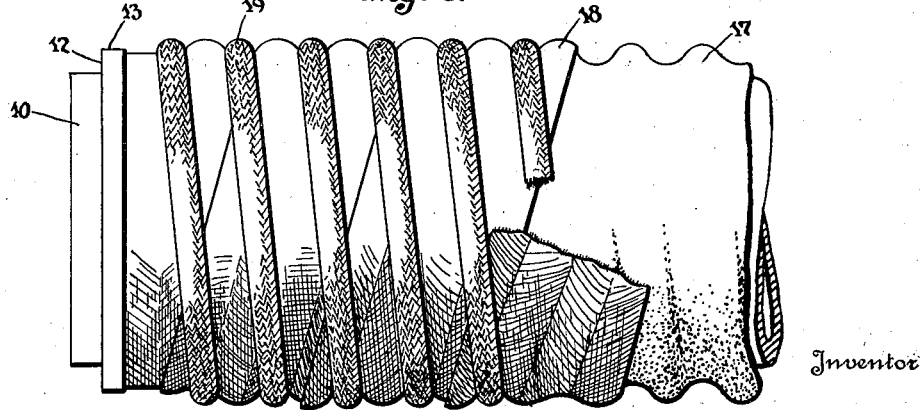
Fig. 3 is a fragmentary plan view of the conduit as it appears in the final stages of its construction, parts being broken away for the sake of clearness.

A second wire 16 is then applied to the inner ply 14, in the same manner as the wire 15, but it is disposed directly on top of the convolutions of the rope 11, instead of between the successive turns. With this construction, there is provided a conduit having a high flexibility, by virtue of its corrugated surface, and which is adapted to withstand both internal and external radial loads, because of the provision of the respective reinforcing elements disposed at the crests and the troughs of the successive convolutions. An additional wrapping or outer ply 17 of bias cut rubberized fabric is then positioned over the mandrel in the same manner as the inner envelope or ply 14, as illustrated in Fig. 2.

To the assembly thus formed, there is applied a helical wrapping of fabric 18, which is wound tightly upon the conduit and which is pulled into place by means of a rope 19, that is also helically wound upon the mandrel to follow the intervals between the convolutions of the inner rope 11. The rope 19 is secured in position, and the mandrel 10, with the hose assembled thereon, is then subjected to a vulcanizing temperature, in order to form a unitary article.

When the vulcanizing operation is completed, the rope 19, the fabric wrapping 18, and the collars 12 are removed. The mandrel 10 is then withdrawn from within the hose, an operation which is facilitated by applying air pressure in the space between the inner ply 14 and the face of the mandrel 10 adjacent the end of the hose. If it be found that difficulty is experienced in removing the conduit, graphite may be applied to the surface of the mandrel, before the assembly is undertaken. This material serves to lubricate the surface of the cylinder 10 and hence, facilitates its subsequent removal.

Figure 4:
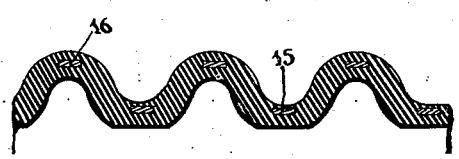
Fig. 4 is a fragmentary longitudinal cross-sectional view of the completed article.

The rope 11 may then be pulled from the interior of the hose to leave the finished article, shown in fragmentary section in Fig. 4. It will be apparent from this view that there is provided a corrugated conduit of unitary construction, which is highly flexible, and which is reinforced against loads applied either radially inwardly or outwardly by means of the helical convolutions or reinforcing wires 15 and 16. The wires themselves are protected from displacement, inasmuch as they are wholly disposed between the plies of fabric material 14 and 17 constituting the walls of the conduit. The tubing is relatively light in weight, flexible and resistant to crushing forces.

From the foregoing description it will be apparent that an efficient method has been provided for making a flexible conduit capable of withstanding heavily imposed radial loads. It is obvious that the method need not be followed in all of its details. The invention should be limited only as set forth in the appended claims.

What I claim is:

1. The method of making a flexible conduit comprising applying an envelope to a mandrel having a helical corrugation defined therein, helically applying elongate reinforcing members to the envelope over the crests and troughs of the helix respectively to define the latter in the envelope, applying an outer cover to the envelope and reinforcing material, and securing the parts to each other.

2. The method of making conduits which comprises forming a raised helix on a cylindrical mandrel, so applying an envelope of bias cut rubberized fabric to the mandrel as to conform to the shape of the helix, applying reinforcing wires to the crests and troughs of the fabric, applying an outer ply of bias cut rubberized fabric, applying pressure to the outer ply to cause it to conform to the shape of the helix, and vulcanizing under heat and pressure to form a flexible conduit having a high resistance to crushing loads.

3. The method of making a flexible conduit which comprises applying a rubberized envelope to a mandrel having a helical corrugation defined therein, helically winding an elongate member over the envelope between the crests of the corrugations, applying an outer rubberized cover to the envelope to correspond to the surface of the latter and the elongate members, vulcanizing the assembly into a unit, and finally removing the unit from the mandrel.

4. The method of making a flexible conduit which comprises applying a rubberized envelope to a mandrel having a member helically disposed thereon, applying a rubberized envelope over the helix, winding elongate reinforcing members between the convolutions of the helix thereby conforming the envelope to the latter, applying an outer rubberized envelope over the first envelope 1?

and reinforcing members, vulcanizing the assembly, and finally removing the conduit from the mandrel and the first mentioned helical member from the inner wall of the conduit.

In witness whereof, I have hereunto signed my name.

Signed at Akron, in the county of Summit, and State of Ohio, this 19th day of October, 1927.

ELMER G. KIMMICH.